(12) United States Patent
Breeuwer et al.

(10) Patent No.: US 7,657,068 B2
(45) Date of Patent: Feb. 2, 2010

(54) INDICATION OF ACCURACY OF QUANTITATIVE ANALYSIS

(75) Inventors: Marcel Breeuwer, Eindhoven (NL); Ursula Goette, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 174 days.

(21) Appl. No.: 10/544,197

(22) PCT Filed: Jan. 19, 2004

(86) PCT No.: PCT/IB2004/050033

§ 371 (c)(1),
(2), (4) Date: Aug. 2, 2005

(87) PCT Pub. No.: WO2004/070659

PCT Pub. Date: Aug. 19, 2004

(65) Prior Publication Data

US 2006/0171572 A1    Aug. 3, 2006

(30) Foreign Application Priority Data

Feb. 5, 2003  (EP) .................................. 03100247

(51) Int. Cl.
*G06K 9/00* (2006.01)

(52) U.S. Cl. ...................................... 382/128; 382/130

(58) Field of Classification Search ................. 382/128, 382/130; 600/410
See application file for complete search history.

(56) References Cited

U.S. PATENT DOCUMENTS

| | | | | |
|---|---|---|---|---|
| 5,648,652 A * | 7/1997 | Sekiya et al. | ............ | 250/201.7 |
| 5,803,914 A * | 9/1998 | Ryals et al. | ................. | 600/407 |
| 6,083,167 A * | 7/2000 | Fox et al. | ..................... | 600/439 |
| 6,560,476 B1* | 5/2003 | Pelletier et al. | ............ | 600/410 |
| 6,847,737 B1* | 1/2005 | Kouri et al. | ................. | 382/260 |
| 2001/0025142 A1* | 9/2001 | Wessels et al. | .............. | 600/425 |
| 2002/0103252 A1* | 8/2002 | Bisgaier et al. | ............ | 514/423 |
| 2003/0065258 A1* | 4/2003 | Gupta et al. | ................ | 600/410 |
| 2004/0241093 A1* | 12/2004 | Lauenstein et al. | ........... | 424/9.3 |

* cited by examiner

*Primary Examiner*—John B Strege

(57) ABSTRACT

An invention is described wherein a medical image analysis process which utilizes information contained in at least one medical image and in which a quantitative evaluation is derived from the medical image analysis process and delivered as an output, also delivers as an output the result of an error analysis, performed in order to provide information relating to the accuracy of the quantitative evaluation. This error analysis may be based on an evaluation of the artifacts which have an effect on the image. This error analysis may also be based on an evaluation of the imaging processes which have an effect on the image.

9 Claims, 2 Drawing Sheets

INDICATION OF ACCURACY OF QUANTITATIVE ANALYSIS

The invention relates to a medical image analysis process which utilizes information contained in at least one medical image, in which a quantitative evaluation is derived from the medical image analysis process and delivered as an output.

Modern medical imaging handling protocols increasingly allow complex and involved analysis of acquired image data to produce determinable quantities. For example, protocols exist to calculate perfusion rates for blood flow, measure the physical sizes of anatomical structures and assign a value to the process of gastric reflux.

An example of such a protocol which provides quantitative results is given in 'Automatic quantitative analysis of cardiac MR perfusion images', Marcel Breeuwer et al., Proceeding SPIE Medical Imaging, vol. 4327, February 2001, San Diego, USA. This describes an automatic quantitative analysis method for evaluating blood perfusion in the heart muscle, or myocardium. It is known that the method sometimes produces occult inaccurate quantitative results. In other words, the image analysis process can produce quantitative results which may be clinically useful or clinically misleading but without any indication of which of these two groups any given quantitative result lies in.

It is an object of the invention to provide the user of quantitative image results with more reliable image data This is achieved according to the method of the invention whereby the result of an error analysis, performed in order to provide information relating to the accuracy of the quantitative evaluation, is also delivered as an output.

The image data used by the protocol can be degraded by a variety of processes which are implicit within the data as a result of the limitations of image acquisition or processing. When these have a visible effect on the image they are known as artefacts. One example of an artefact is noise, the statistical variation in voxel intensity value, which adds an intrinsically unquantifiable value to the real intensity value which is allocated to any particular voxel. The process of image reconstruction assumes that it is possible to assign an exact value to this voxel intensity, whereas in reality the value assigned is always a composite of the real value which describes the tissue being represented by the voxel and an extra value ascribed to noise. When a protocol aimed at deriving quantitative results is applied to the image, is utilizes the intensity values designated to each voxel as basic input values. The noise element of the intensity value is fed into the evaluation process along with the part of the intensity value which represents the real tissue and the inclusion of the noise value feeds an error into the eventual quantitative result.

Other processes which degrade the image have a similar effect, albeit for different reasons, on any eventual mathematical result. For example, the partial volume effect, by which voxels representing tissue matter at, or near, the boundaries of tissue divisions characterized by different intensity values, are rendered with intensity values which are merely averages of the surrounding intensities. This introduces entirely spurious intensity values which, when fed into a quantitative evaluation process, again introduce an inaccuracy which is difficult to perceive.

The processes which have an effect on the eventual image also include the inherent limitations of the imaging process and the imaging steps taken to translate that process into a visual end result. For example, the resolution of the digital image, which can be thought of as the smallest object in the image which can be detected, influences any final quantitative result derived from the image. A higher resolution is achieved in a digital image by displaying the image using a greater number of pixels. This spreads the overall information content in the image over a larger number of pixels and in the case of an image derived from radiation will increase the statistical fluctuation of the intensity value in each pixel. However, a greater resolution, and therefore a larger number of pixels, will result in more pixels being included in any regional contour imposed on the image for the purposes of quantitative analysis. This will have the result of improving the statistical fluctuation of the eventual quantitative result.

These, and other artefacts and contributory processes having an effect on the quantitative analysis, can be modeled. As a first step, the quantitative information, or data, which is presented as an output of the normal quantitative analysis can be modeled, either mathematically by using equations or by synthetically constructing data. Both of these procedures would be well known to those skilled in the art of medical image analysis processes and result in the quantification of an ideal process, as it would be if unaffected by artefacts or any error introduced into the quantitative process. This ideally quantified process also therefore reveals a final, ideal, quantitative result representing a quantitative result as would be achieved if there were no artefacts in the image nor any other introduced error.

Once this ideal quantitative analysis has been modeled and an ideal quantitative result produced, the next step is identify possible image artefacts and image processing steps and to evaluate the influence of these on the quantitative analysis or quantitative evaluation. Such artefacts and image processing steps may include, as is known to those skilled in the art of medical image analysis, image resolution, noise, partial volume effect, sampling rate, time intensity behavior, subject motion, the production of outlier image, the effects of residual contrast agent, registration inaccuracies, segmentation inaccuracies and errors in placing contours. As will be appreciated by those skilled in the art, there may be other processes which affect the image data in such a way as to introduce an error into the quantitative process, and the invention may therefore be worked so as to incorporate those processes.

The identified image processing steps and artefacts are evaluated for their effect on the ideal quantitative result This can be by a process of mathematical modeling or by the use of a phantom, or by both. For example, statistical image noise, as is known to those skilled in the art, can easily be modeled as a standard deviation. This statistical variation can be added to the ideal model of the quantitative process with the result that the final quantitative result varies from the idea. The error introduced into the quantitative result has therefore been modeled.

All the artefacts or image processing steps considered to be potentially influential on the final quantitative result can be likewise modeled in ways which are known to those skilled in the art. In each case, the effect produced by the modeled process on the final quantitative result can be calculated and therefore assessed for its quantitative importance.

Once this step has been completed, according to the method of the invention, the most important image processing steps and image artefacts which contribute to the overall degradation of the image are identified. There are no hard and fast rules as to which, out of all the image processing steps and all of the possible image artefacts, should be chosen. The number of individual influencing items considered to be ultimately important will depend on how reliable the user of the eventual quantitative data would like that data to be. This may also depend on the specific factors present in the particular quantitative process under evaluation. For example, noise is a fairly constant artefact in all images but motion artefacts are more likely to occur in image sequences which represent internal anatomical motion, such as the motion of the diaphragm, say, during breathing. If the method were applied to the evaluation of the accuracy of simple quantitative measurement of a static anatomical structure, there would be little reason to include a motion artefact Yet another example of an influencing characteristic is intensity inhomogeneity, which can cause image artefacts in magnetic resonance images. Intensity inhomogeneities originate from the inhomogeneous sensitivity profile of receiver coils, and especially surface coils. These inhomogeneities can be observed as a variation in intensity across the image and causes pixels representing the same tissue type to be rendered with unequal intensities. The effect of intensity inhomogeneities on an analysis outcome can be very severe because the range of intensities used for the same particular tissue type can influence the correct recognition of that tissue type and therefore the tissue type boundaries in a contouring or segmenting procedure.

Following an identification of the important processes affecting the accuracy of the quantitative process, the method of the invention proceeds with a more detailed modeling of the effects of the combination of the influencing processes. The important processes are now ascribed values, as is known to those skilled in the art, and further evaluated using all combinations of values of each of the processes.

This modeling of the joint effect of the important artefacts and image processing steps on the model of the quantitative analysis allows a further numerical evaluation of these for their effect on accuracy. It may be, for example, that the form of the quantitative analysis under consideration renders three or four particular processes amongst the artefacts and image processing steps as highly influencing. In such a case, the invention proceeds with a more detailed investigation of just these three or four processes. As is known to those skilled in the art, all of these processes can be ascribed a range of values, but if they are ascribed a discrete range of values, then discrete numerical combinations of them can be added to the ideal quantitative model to produce another quantitative result representing, now, the effect of that particular combination of values of those processes on the quantitative analysis.

The results of this analysis of inaccuracy can be stored in a look up table or indeed in any multi-dimensional table, as is known in the art, or may be stored within a formula In other words, the values are stored in such a way that knowledge of the combination of values of the influencing processes leads to the value of the error introduced by that combination of values. The results, once accessed, can be presented to the viewer along with the mathematical quantitative result of the imaging analysis process.

Knowledge of the combination of values of the influencing processes within a medical image analysis process can be easily determined by those skilled in the art. Noise, for example, can be easily quantified by taking a sample of a medical image where that sample contains only noise and measuring the intensity values rendered in each pixel to calculate the value of the standard deviation of the variation of those intensity values. Values can, by other analytical processes, be attributed to other influencing artefacts and imaging processes by those skilled in the art.

Storage within a formula, in this case, is useful when the combinations of values of the influencing processes, and their resulting effect on the error within the quantitative analysis, can be easily modeled. When this is the case it has the advantage that it saves on the computing power which would otherwise be needed when the results are stored in a multi-dimensional table of high dimensional order.

It is important to note that in the case of a particularly simple quantitative analysis, it may be possible to perform the error analysis and calculation during the quantitative analysis itself. This may be possible, for example, when there is only one influencing process, say noise, and this can be analyzed and evaluated during the original imaging process itself. In such a case, storage may not be necessary. It is also possible that only a single error result could be handled and delivered by the method of the invention as an output.

An important point to be aware of is that all these diverse effects on the quantitative content of a medical image can be appreciated qualitatively by any user with a good understanding of the physical processes behind medical imaging, but cannot be accurately perceived on an individual case by case basis. In other words, we can say with some degree of certainty that the noise in an image has contributed to the inaccuracy of some mathematical quantity extracted from the image, but we cannot assess the exact quantitative effect just by looking at the image. Similarly, we can understand that partial volume effect may have introduced an inaccuracy into a consequential quantitative result but are completely unable to tell by looking if indeed it has or what the quantitative effect might be.

The invention provides the user with more reliable image data because it solves the problem of how to assess the accuracy of quantitative results which are dependent on the medical images. Quantitative results which are derived from medical images are based on the contents of the medical image data and such data content is visually complex and difficult for the eye to assess. Early medical images were developed directly onto hard copy and viewed by the user, so any analysis of the image was restricted to a qualitative assessment only. The advent of digitization and the application of modern digital data handling to medical imaging has placed the viewer in an unparalleled position in the history of medical evaluation. The user is now in a position to analyze the information content of the medical images with which he is presented and extract quantitative values. But medical images, as aggregates of pixel intensity values, contain far too much parallel information for a single viewer or user to mentally assess the quantification within the image. The viewer of digital medical image information who wishes to use the mathematical results of a quantitative analysis has no way of visually assessing how reliable, repeatable or accurate those results are by himself. Therefore evaluating and presenting a value for error in a quantified extracted result allows the user to assess the reliability of the results in a way which was not previously available to him. For this reason, the invention as described adds an important contribution to the use of medical image analysis processes for the extraction of quantitative data.

The invention is further explained for those skilled in the art with the help of the following figures.

Figure 1:
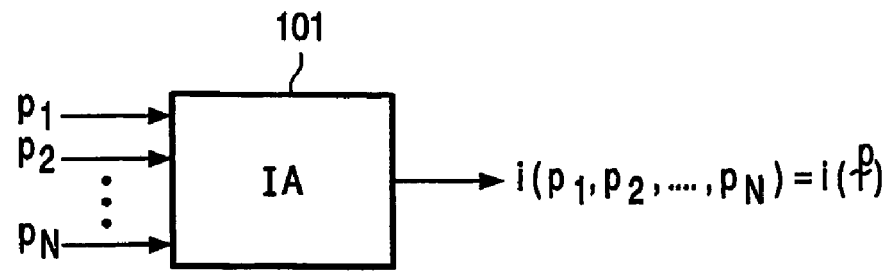
FIG. 1 shows the normal process of imaging analysis which can be improved using the method of the invention.

FIG. 1 gives a graphical representation of the effect which artefacts, imaging processes affect a quantitative image. Any such influencing process or parameter, $p_1$, for example, is incorporated in an image analysis IA, 101, with the result that the output of that image analysis, i, becomes a function of the influencing parameter. So, for example, numerous artefacts such as noise, partial volume effect, and imaging processes such as registration may affect the image analysis as $p_1$, $p_2$ and $p_3$. The resulting image is dependent on the values of these parameters and can be expressed as $i(p_1, p_2, p_3)$. In the most general case, as shown in FIG. 1, the image is affected by an unquantified number of parameters, $p_N$, and the resulting image can be expressed as $i(p_1, p_2, \ldots, p_N)$, or $i(\underline{p})$.

Figure 2:
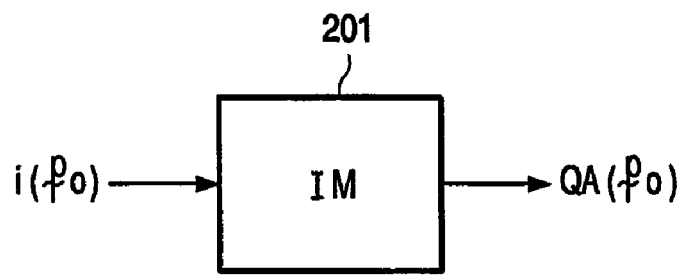
FIG. 2 shows the processes by which error influences the calculation of quantitative data, and how this process is then modeled according to the method of the invention.
Figure 2:
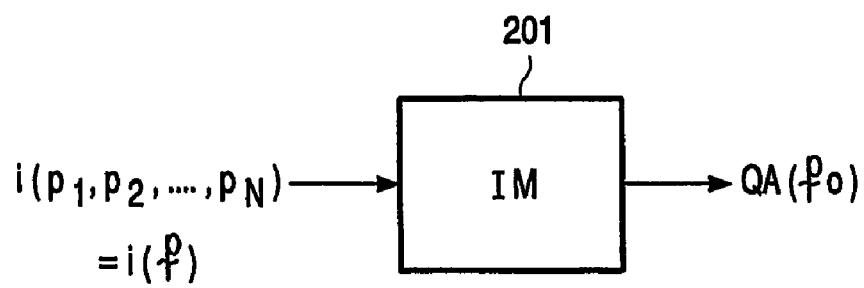

FIG. 2 gives a graphical representation of the modeling process utilized within the invention. An ideal image, completely unaffected by artefacts and containing no error introduced by the imaging process, can be expressed as $i(0,0,\ldots,0)$, or $i(\underline{p}_0)$. If this is fed into the image modeling process IM, 201, it will result in a baseline value for the quantitative result, $QA(\underline{p}_0)$. The important, or most influential, artefacts and imaging processes deemed to have an effect on the overall process of quantification act together to produce an image $i(p_1, p_2, \ldots, p_N)$, which, if subject to the same image modeling process IM, 201, results in further quantitative result, $QA(\underline{p})$. This quantitative result, $QA(\underline{p})$, is inaccurate in that it deviates from the ideal result, $QA(\underline{p}_0)$, and this difference $\Delta(\underline{p})$, can be measured as the difference between the two quantitative results, $QA(\underline{p}_0)$ and $QA(\underline{p})$.

Figure 3:
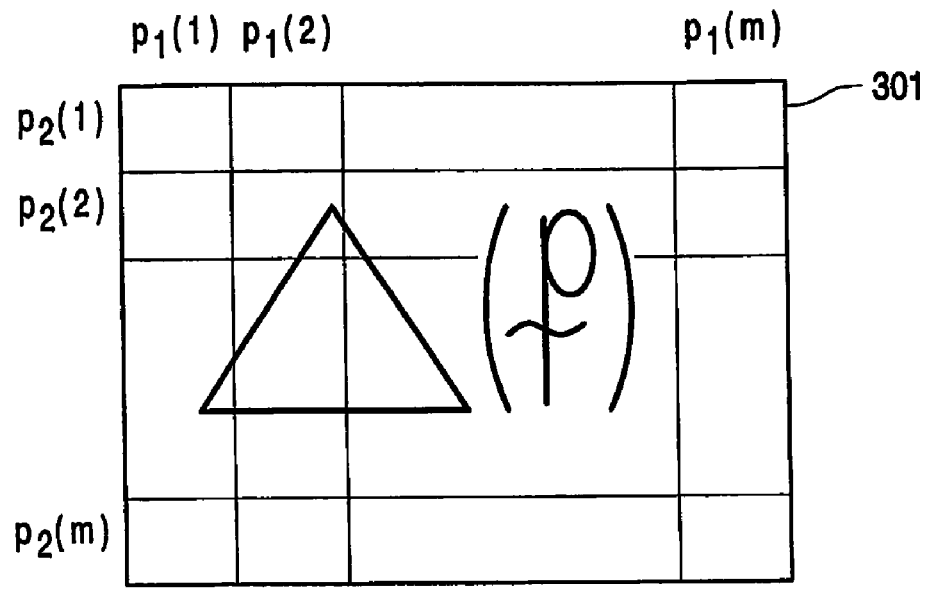
FIG. 3 shows the filling of a table of data, according to the method of the invention.

FIG. 3 shows a method for constructing a table, according to the invention, by which the error which is introduced into the quantitative process by the parameters with the most influence can then be utilized to provide the user of the quantitative process with information according to the invention. FIG. 3 shows this using a simplified model utilizing only two parameters.

Parameters, $p_1$ and $p_2$, which influence the quantitative process can take different values. Normally the values would vary over a continuum, but for the purposes of modeling are restricted to discrete values $p_1(1)$, $p_1(2)$, $p_1(M)$ for $p_1$ and $p_2(1)$, $p_2(2)$, $p_2(M)$ for $p_2$. Images containing all combinations of these values are then remodeled using the modeling processes developed so that quantitative results $QA(p_1, p_2)$ are produced for all combinations of values for $p_1$ and $p_2$. These values all vary from the ideal quantitative result $QA(\underline{p}_0)$, where $p_1$ and $p_2$ are both zero, by some difference, $\Delta(\underline{p})$, and these differences are then fed into a table 301 for future use. The form of the value representing this difference may be stored as the basic value of variation, or may be stored as a percentage difference or indeed in any other formulation which allows it to be used as a quantification of error.

The case described above concerns only two parameters, $p_1$ and $p_2$, and therefore shows a two dimensional table. A greater number of parameters would be stored in a table with the equivalent number of dimensions, as would be obvious to one skilled in the art.

Figure 4:
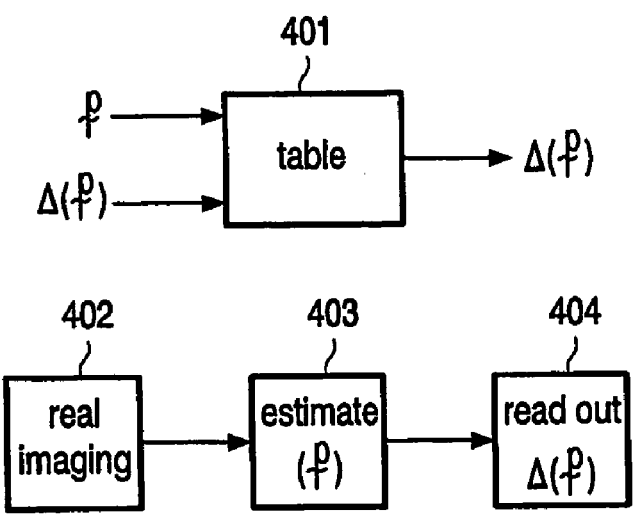
FIG. 4 shows the extraction of data in the course of a real imaging analysis process to which the invention has been applied.

FIG. 4 shows the method of the invention as perceived by the end user. The various values of $\underline{p}$ and $\Delta(\underline{p})$ have been inserted into the table 401 from which the error, $\Delta(\underline{p})$, can be read out. These results can now be applied to a real imaging session, 402, in which images for the purpose of quantitative analysis are produced. These images must be further analyzed to estimate, or evaluate, the values of the influencing parameters, $\underline{p}$, which are incorporated into the image results of the real imaging session. This is easily done by those skilled in the art using known techniques, and results in a series of values, $p_1(M)$ and $p_2(m)$, for example, which can be used to address the relevant value of error, $\Delta(\underline{p})$. In the case where the values attributed to $\underline{p}$ do not coincide completely with the values stored in the table, any interpolation or approximation method can be used, as would be apparent to those skilled in the art. The value, $\Delta(\underline{p})$, can be presented to the user in any known way, to allow the user to assess the accuracy and reliability of the quantitative result of the medical image analysis process.

The invention claimed is:

1. A medical image analysis process which utilizes information contained in at least one medical image, the process comprising:
   deriving a quantitative evaluation including a difference between an ideal image unaffected by artefacts and the at least one medical image affected by artefacts;
   delivering the quantitative evaluation as an output,
   performing an error analysis in order to provide information relating to the accuracy of the quantitative evaluation, said analysis yielding a result, and,
   delivering the result as a further output.

2. The medical image analysis process, as claimed in claim 1, characterized in that the error analysis comprises steps wherein an image artefact which contributes to the image analysis process is identified, wherein the image artefact has an influence on the accuracy of the quantitative evaluation, which influence is calculated, and the results of the calculation of the influence on the accuracy of the quantitative evaluation is incorporated into the delivered further output.

3. The medical image analysis process, as claimed in claim 1, characterized in that the error analysis comprises steps wherein an image processing step which contributes to the image analysis process is identified, wherein the image processing step has an influence on the accuracy of the quantitative evaluation is calculated, which influence is calculated, and the results of the calculation of the influence on the accuracy of the quantitative evaluation is incorporated into the delivered further output.

4. The medical image analysis process, as claimed in claim 2, characterized in that the results of the calculation of the influence on the accuracy of the quantitative evaluation is stored prior to incorporation into the delivered output.

5. The medical image analysis process, as claimed in claim 4, characterized in that, the results of the calculation of the influence on the accuracy of the quantitative evaluation is stored in at least one of a multidimensional table, a look up table, or a formula.

6. The medical image analysis process, as claimed in claim 2, characterized in that, the identified image artefact which contributes to the image analysis process is at least one of noise, partial volume effect, sampling rate, inhomogeneity within the medical imaging process or an artefact due to patient motion.

7. The medical image analysis process, as claimed in claim 3, characterized in that, the identified image processing step which contributes to the image analysis process is at least one of registration, outlier classification, contour placement or segment placement.

8. The medical image analysis process, as claimed in claim 1, characterized in that, the medical image analysis process which utilizes information contained in the at least one medical image is the assessment of cardiac perfusion data, and the quantitative evaluation which is derived from the medical image analysis process and delivered as the output is the myocardial perfusion reserve index.

9. A program storage device readable by a machine, tangibly embodying a program of instructions executable by the machine to perform method steps, for a medical image analysis process which utilizes information contained in at least one medical image, the method steps comprising:
   deriving a quantitative evaluation including a difference between an ideal image unaffected by artefacts and the at least one medical image affected by artefacts
   delivering the quantitative evaluation as an output,
   performing an error analysis in order to provide information relating to the accuracy of the quantitative evaluation, said analysis yielding a result, and,
   delivering the result as a further output.

* * * * *